Figure 1:
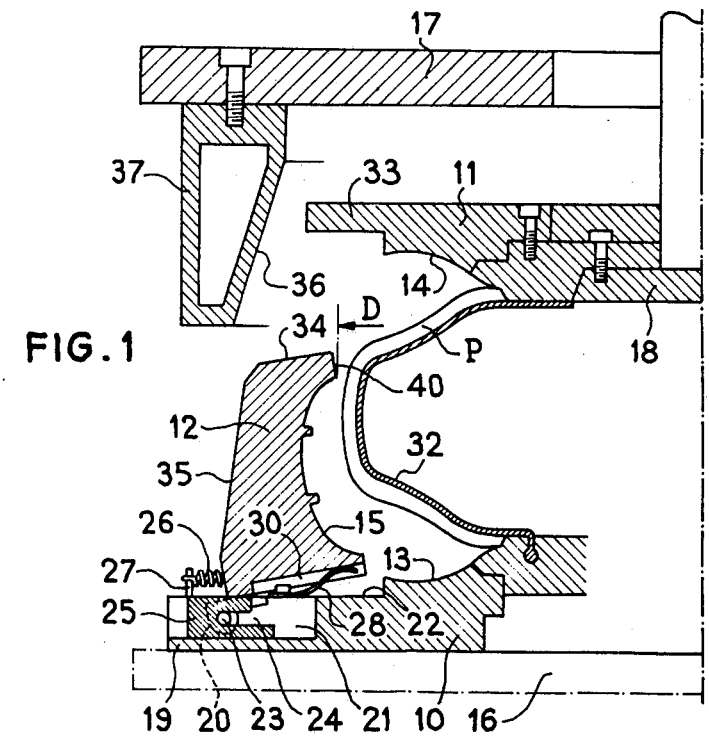
Figure 2:
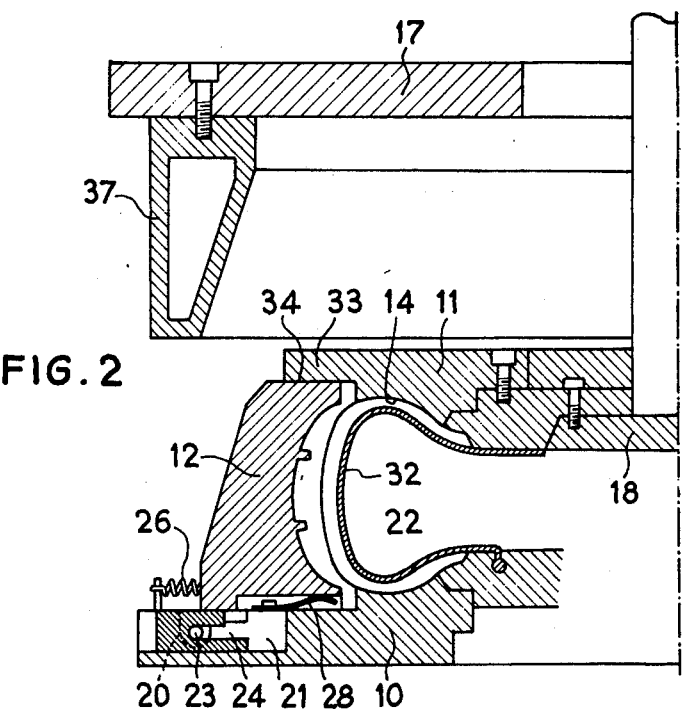

United States Patent [19]

Le Moullac

[11] 4,289,463
[45] Sep. 15, 1981

[54] SEGMENTED MOLD FOR TIRE CASING

[75] Inventor: Roger Le Moullac, Le Plessis Bouchard, France

[73] Assignee: Pneumatiques Caoutchouc Manufacture et Plastiques Kleber-Colombes, Colombes, France

[21] Appl. No.: 166,823

[22] Filed: Jul. 8, 1980

Related U.S. Application Data

[63] Continuation of Ser. No. 771,575, Feb. 24, 1977, abandoned.

[30] Foreign Application Priority Data

Feb. 24, 1976 [FR] France .............................. 76 05184

[51] Int. Cl.³ .............................................. B29H 5/02
[52] U.S. Cl. ........................................ 425/47; 425/46; 425/38
[58] Field of Search ........................ 425/36, 39, 46, 47

[56] References Cited

U.S. PATENT DOCUMENTS

| | | | |
|---|---|---|---|
| 3,553,789 | 1/1971 | Allitt | 425/36 |
| 3,730,658 | 5/1973 | Marra | 425/47 |
| 3,989,791 | 2/1976 | Tippin | 425/464 |
| 3,990,823 | 11/1976 | Le Moullac | 425/47 |

FOREIGN PATENT DOCUMENTS

| | | | |
|---|---|---|---|
| 2315461 | 3/1973 | Fed. Rep. of Germany | 425/39 |
| 519339 | 7/1976 | U.S.S.R. | 425/46 |

*Primary Examiner*—J. Howard Flint, Jr.
*Attorney, Agent, or Firm*—Craig and Antonelli

[57] ABSTRACT

A segmented mold for molding tire casings has a fixed lower mold part for molding one side wall of the tire, a series of molding segments for molding the tread movably mounted on the lower mold part to be slidable and swingable along radial planes, an axially movable upper mold part for molding the other side wall of the tire, and means cooperating with the segments to effect the movement thereof along the radial planes. The mold also has elastic members interposed between the fixed lower mold part and the segments for continously urging each of said segments toward an open position in which the segments are radially retracted and swung upward and to the outside of the mold to free a passage for the tire when the upper mold part is lifted off. These members include a first spring for pulling each segment radially outward and a second spring for tilting each segment vertically upward toward an open position.

6 Claims, 6 Drawing Figures

U.S. Patent  Sep. 15, 1981  Sheet 1 of 3  4,289,463

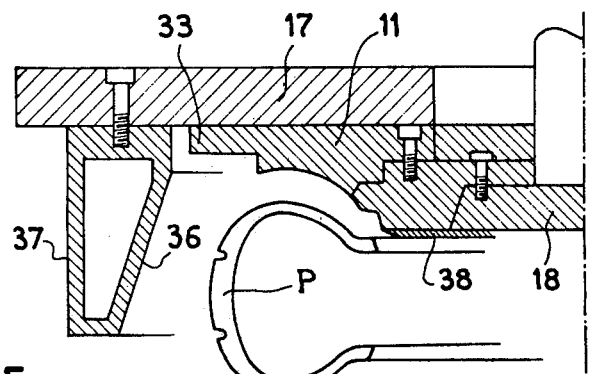
FIG. 5
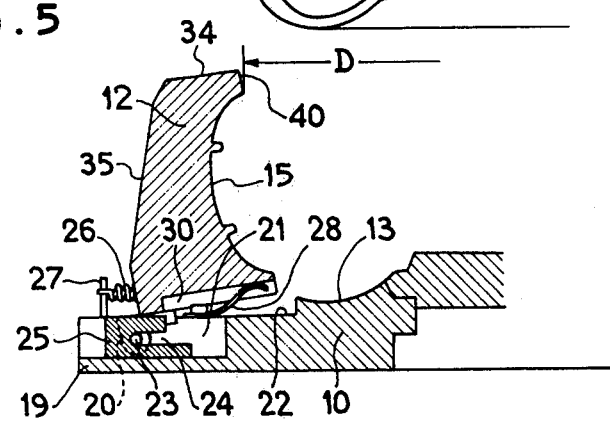
FIG. 6
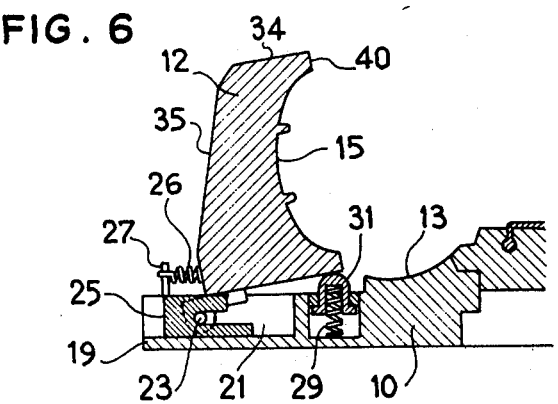

SEGMENTED MOLD FOR TIRE CASING

This is a continuation of application Ser. No. 771,575, filed Feb. 24, 1977, now abandoned.

The invention relates to segmented molds used for molding and vulcanizing tire casings. These molds generally comprise a fixed lower mold part for molding the side wall of the tire, an axially movable upper mold part for molding the other tire side wall, an assembly of molding segments for the tread, and means for radially bringing the segments toward each other to form an uninterrupted molding ring, or radially to separate them, toward an open, unmolding position.

In certain known segmented molds, the segments are suspended from the upper mold part or the movable upper plate of the press so that when the press is opened the segments will move with the plate as it is lifted off and swung. In other known molds, the segments are permanently supported by the lower fixed plate of the press or by the fixed lower mold part resting on the said plate, in such a way that the segments do not have to be lifted off with the movable upper plate when the press is opened. The invention relates to molds of this second type, and it concerns improvements that will enhance the operation, on the one hand increasing the dimensional capacity of these molds with reference to a specific external bulk that is determined and imposed by the type of press which receives the said molds, and on the other hand reducing maintenance costs for said molds.

Examples of embodiment of the invention are described below in more detail with reference to the attached drawings, wherein:

FIGS. 1 to 5 are part in elevation part in section, showing a mold in its various successive positions in operation of the press FIG. 6 is a partial view of a variant of the mold, in its open position.

The molds illustrated in these drawings comprise, in the conventional way, a fixed lower mold part 10, an axially movable upper mold part 11, and a series of segments 12 mounted on lower mold part 10. The lower and upper mold parts have opposed concave surfaces 13, 14, for molding the tire side walls, and the segments have concave inner surfaces 15 presenting reliefs to mold the grooves of the tread.

These molds are meant to be used in a known molding press comprising a fixed lower plate 16, a movable upper plate 17 and a central plunger 18 that is axially movable independently of plate 17. Lower mold part 10 is fixed to lower plate 16, and upper mold part 11 is fixed to plunger 18 so that it can be moved axially, independently of upper plate 17 in the course of the molding cycle.

Segments 12 are mounted on an outer circular edge 19 of fixed lower mold part 10, so as to be slidable and swingable along radial planes. To effect this, each segment 12 presents at its base, on the outside, a strap 20 that projects downward and engages in a radial groove in a piece 25 which is mounted in a radial groove 21 on bearing face 22 of edge 19. Said strap presents a cross pin 23 that engages in the radial groove or stud hole 24 of piece 25. Each segment 12 therefore may slide on bearing face 22 of edge 19 of the mold part while being guided radially by the fit of strap 20 in the groove of piece 25. Each segment may also swing upward, pivoting about pin 23, no matter what the radial position of the mold part on edge 19 may be, because of stud hole 24.

Segments 12 are furthermore continuously urged toward their open position, at the same time being pulled back and swung up and to the outside. The retraction movement is ensured for example by tension springs 26 hooked onto the back of the respective segments and onto fixed screw eyes 27. Said springs 26 steadily urge the segments toward their radially retracted open position determined by the abutting of pins 23 on the floor of their respective stud holes 24. The swinging movement is ensured by springs 28 or 29 introduced between edge 19 of mold part 10 and the lower front part of the respective segments, said springs tending to swing the segments upward and to the outside, about their pivot pins 23. In FIGS. 1-5, springs 28 are severally constituted by a cambered steel blade fixed on one side of edge 19, the other side bearing on the front part of the segments. A groove 30 may be made in the lower face of the segments (or possibly in the upper bearing face 22 of edge 19 of the mold part) to seat the spring blade 28 when the segments are bent down onto edge 19. In the case of FIG. 6, springs 29 are helicoidal springs seated vertically in edge 19, each acting on a pusher 31 whose stroke is vertically limited toward the outside.

Starting from the open position of the mold as shown in FIG. 1, the molding of the tire in this mold is effected as follows. A green tire P having been introduced into the mold when plunger 18 and upper mold part 11 were in the high position, the said plunger and the said mold part are lowered together while the shaping bag 32 is inflated, to expand the tire toward the outside. In the course of this descending movement, a flat outer edge 33 of upper mold part 11 is applied on upper surface 34 of the segments in their swung up position, so as to bend them down against edge 19 of lower mold part 10, pivoting them around pins 23 at the bottom of their respective stud holes 24, against the recall action of springs 28 or 29. At the end of this descending movement by upper mold part 11, molding surfaces 13-14 of the mold parts are applied to the sides of the tire (FIG. 2) and segments 12 are bent down horizontally but still held separated from the tire tread by the retracting action of springs 26.

Figure 3:
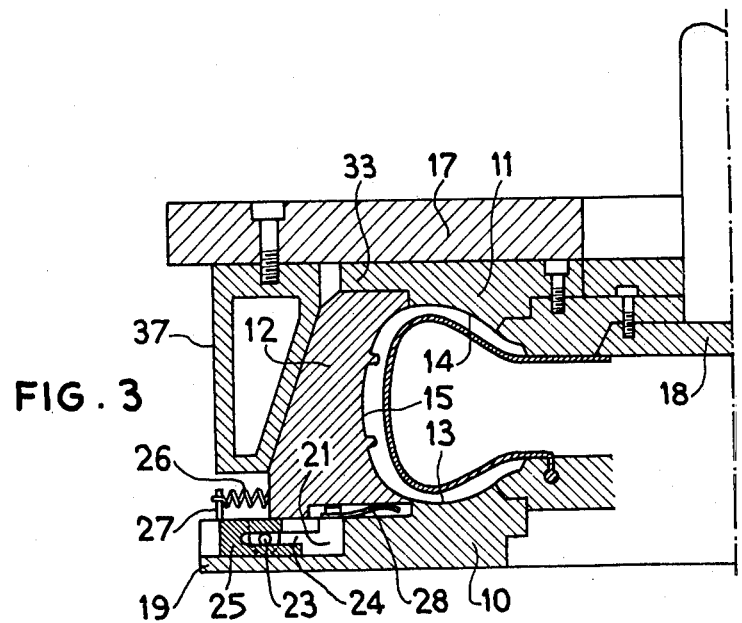

FIG. 3 shows the mold in the next phase, the actual molding, after action by means that radially bring sectors 12 toward each other, to form an uninterrupted molding ring for the tire tread. These means for radial movement of the segments toward each other comprise, in the illustrated example, cooperating conical surfaces, some of which (35) are on the back of segments 12, and the others (36) are on the skirt or hoop 37 which is fixed to upper plate 17 of the press. This plate-and-hoop assembly was held in the high position during the descent of upper mold part 11, and it is now brought all the way down so that conical surface 36 of the hoop causes radial approach of segments 12 against the urging of their recall springs 26, until the segments are tightly applied onto the mold parts, and join each other circumferentially. In the course of this approaching movement of segments 12, articulation pins 23 slide freely in their stud holes 24. This movement of the segments is solely radial, and the penetration of the molding reliefs is perpendicular to the tread, without any component of rotation of the segments.

Hoop 37 is advantageously hollow, to allow delivery there of a heating fluid for segments 12, for vulcanizing the tire. During the molding upper plate 17 is applied on the upper mold part to hold the mold closed in spite of internal molding pressure exerted by bag 32.

Figure 4:
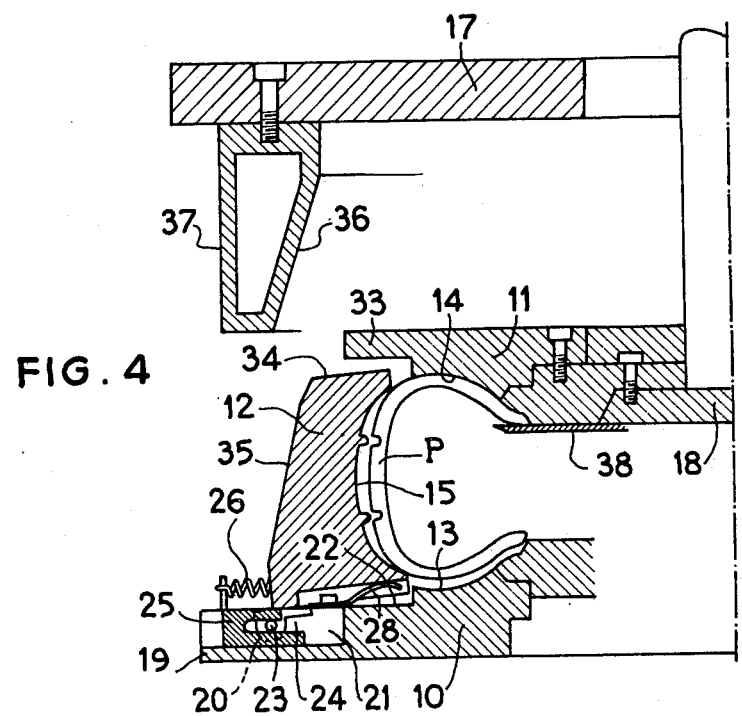

FIG. 4 shows the mold at the beginning of its opening after vulcanizing of the tire. Upper plate 17 and hoop 37 are first raised to free the outer periphery of segments 12 and then plunger 18 and upper mold part 11 are lifted. Springs 28 or 29 then tend to swing segments 12 upward, pivoting them around their pins 23, and tending to detach the segments from the tread of the molded tire. Once this detachment has been effected, recall springs 26 can in turn act to pull segments 12 back radially while springs 28 or 29 complete the swinging of the segments upward and to the outside. This latter position is shown in FIG. 5 where we see the completely open position of the mold, with the plunger and mold part 11 moved up against plate 17. Depending upon the type of press, the molded tire may rest on lower mold part 10, or be raised by an extracting mechanism 38 which engages the tire below the bead, or by a central jack on the lower plate. In the latter case the lifting of the tire by extractor 38 or by the jack may help in detaching the segments from the tread, its effect being added to that of the swing-springs. After extraction of the molded tire the press is then ready for a new cycle.

In the mold system described above, the mounting of the segments which is both swinging and sliding, associated with the springs that recall the segments to their open position, offers the following advantage: in the open position of the mold, the front upper edges or lower edges 40 of the segments are maximally retracted to facilitate introduction of the green tire to be molded as well as the removal of the molded tire. In fact, the upper edges 40 of the segments that are thus retracted leave a wide passage, of diameter D, which is greater than the outer diameter of the molded tire. This is managed with conservation for the segments of a relatively limited swing amplitude, of the order of about 10°, which allows use of swing springs that have a relatively short stroke, readily seated between the segments and the fixed mold part. This also makes it possible to impart to the segments a molding configuration that is pronouncedly concave, with the inner edges broadly enveloping the shoulders of the tread, which is of particular interest, in order to get grooving of the tread that will extend without a break to the bottom of the tire shoulders.

Moreover, because of the relative independence of the axial movements of upper mold part 11 and means for bringing the segments toward each other radially (means here constituted by conical surfaces 35-36), it is possible to effect kinematic movements of closure and opening of the mold that are very favorable for correct molding of the tire. In closing, the sides of the tire can first be gripped between the molding surfaces of the mold parts while the segments are bent down horizontally in a first motion of rapid approach, and then these segments are brought toward each other by a second purely radial movement of penetration into the tire. Similarly in opening, the initial disengagement of conical hoop 37 allows the segments, from the start of the lifting off of the upper mold part 11, to be extracted from the groovings of the molded tire [tread] by a practically radial movement of retraction. These radial movements of penetration and/or retraction by the segments promote production of flawless groovings in the molded tread.

Another important advantage of this type of mold derives from the possibility of a relatively primitive construction which entails only low maintenance costs. We know that the high operating temperatures of these molds involve serious problems of dilatation and lubrication of the moving parts, and that there are frequent breakdowns due to seizing of contact surfaces in known segmented molds, the frequency of these breakdowns being substantially in proportion to the radial sliding movements of the sections. This risk is much reduced here, on the one hand because the approach and retraction movement is decomposed into a slight radial sliding motion and a small-amplitude pivoting motion which does not involve any seizing, and on the other hand because the sliding and swing assembly of the segments can be managed without any other difficulty, with a relatively large amount of play in the radial grooves of pieces 25 and about the pins 23, so as to reduce the danger of seizing.

Of course, the invention is not strictly limited to the examples of embodiment described above and illustrated in the drawing, whereof variants can be imagined.

I claim:

1. A segmented mold for molding tire casings which comprises a fixed lower mold part for molding one side wall of the tire, a series of molding segments for molding the tread movably mounted on said lower mold part to be slidable and swingable along radial planes, an axially movable upper mold part for molding the other side wall of the tire, and means cooperating with the segments to engage and move said segments toward each other along said radial planes, said mold further comprising in combination:
   (a) elastic means interposed between the fixed lower mold part and the segments for continuously urging each of said segments toward an open position in which the segments are radially retracted and swung upward and to the outside of the mold to free a passage for the tire when the upper mold part is lifted off, said elastic means including first spring means for pulling each segment radially outward and second spring means for tilting each segment vertically upward toward an open position, and
   (b) means for axially moving the upper mold part operating independently of the means for moving the segments toward each other along said radial planes, thereby allowing the upper mold part to be lowered into a molding position before the operation of said means for radially moving the segments toward each other, and being removed after disengagement of said means for effecting movement of said segments toward each other.

2. A segmented mold according to claim 1, wherein the upper mold part has an outer edge that can engage an upper portion of each of the segments in the open position in order to tilt said segments down against the lower mold part in opposition to the second spring means for tilting the segments upward before the action of the means for radially moving the segments toward each other.

3. A segmented mold according to claim 1, wherein the second spring means comprises cambered blade springs interposed between contact faces of each segment and an outer edge of the fixed lower mold part for tilting the segments toward an open position.

4. A segmented mold according to claim 1, wherein said second spring means comprises helicoidal springs seated in an outer edge of the fixed lower mold part for tilting each segment toward a swung open position.

5. A segmented mold according to claim 1, wherein each of said segments provide a concave molding surface with edges that envelop the shoulder portions of the tire tread.

6. A segmented mold according to claim 1, wherein each of the segments are provided with means for pivotally mounting the segment to the lower mold part, said mounting means including a projection on the lower part of each segment which projects into a radial groove in the lower mold part, and retaining means for securing said projection within said radial groove.

* * * * *